Jan. 31, 1933.  S. R. THOMAS  1,895,825
TORSIONAL VIBRATION DAMPER
Filed April 29, 1930  2 Sheets-Sheet 1
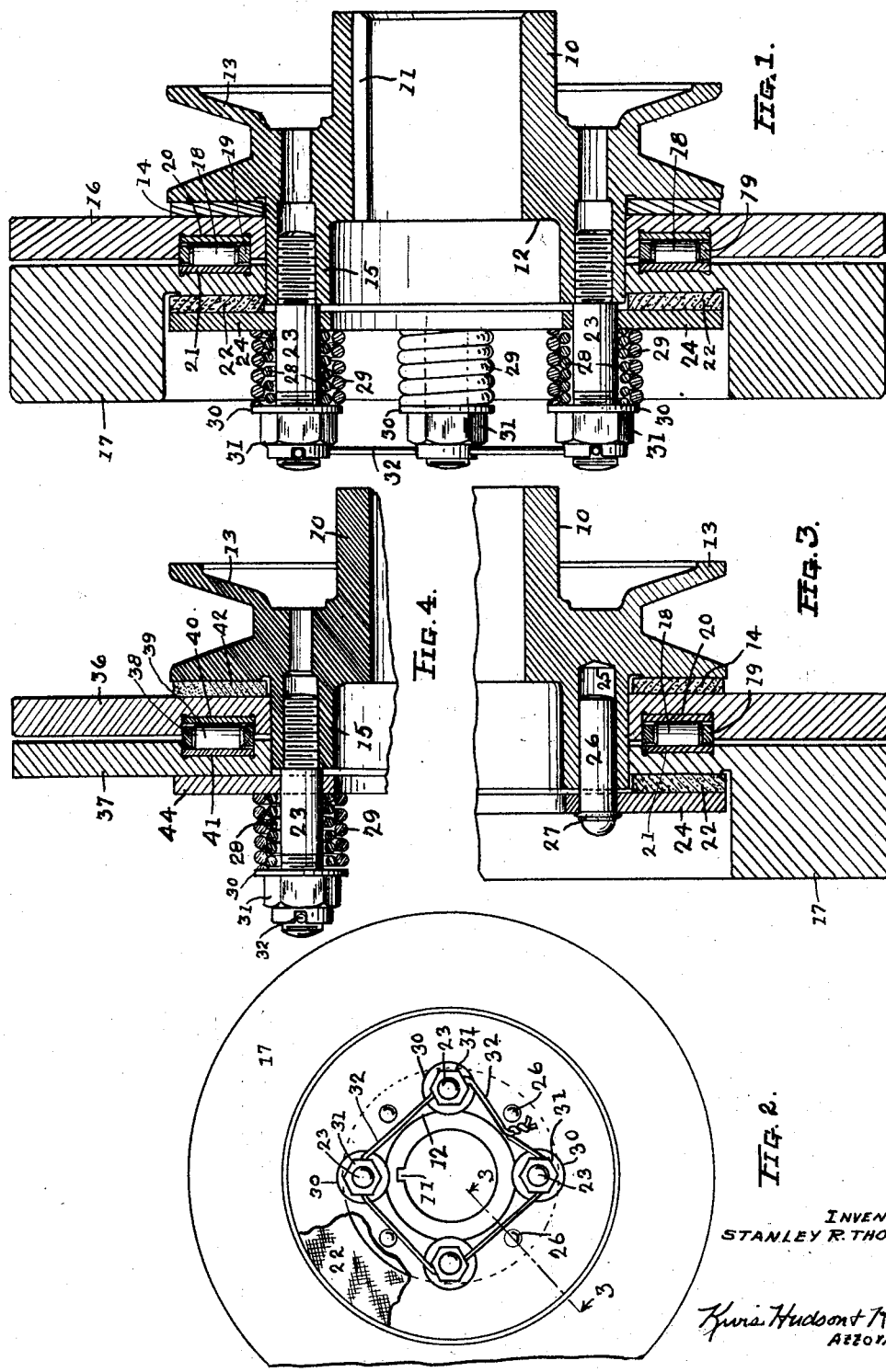
INVENTOR.
STANLEY R. THOMAS
Kris Hudson & Kent
ATTORNEYS.

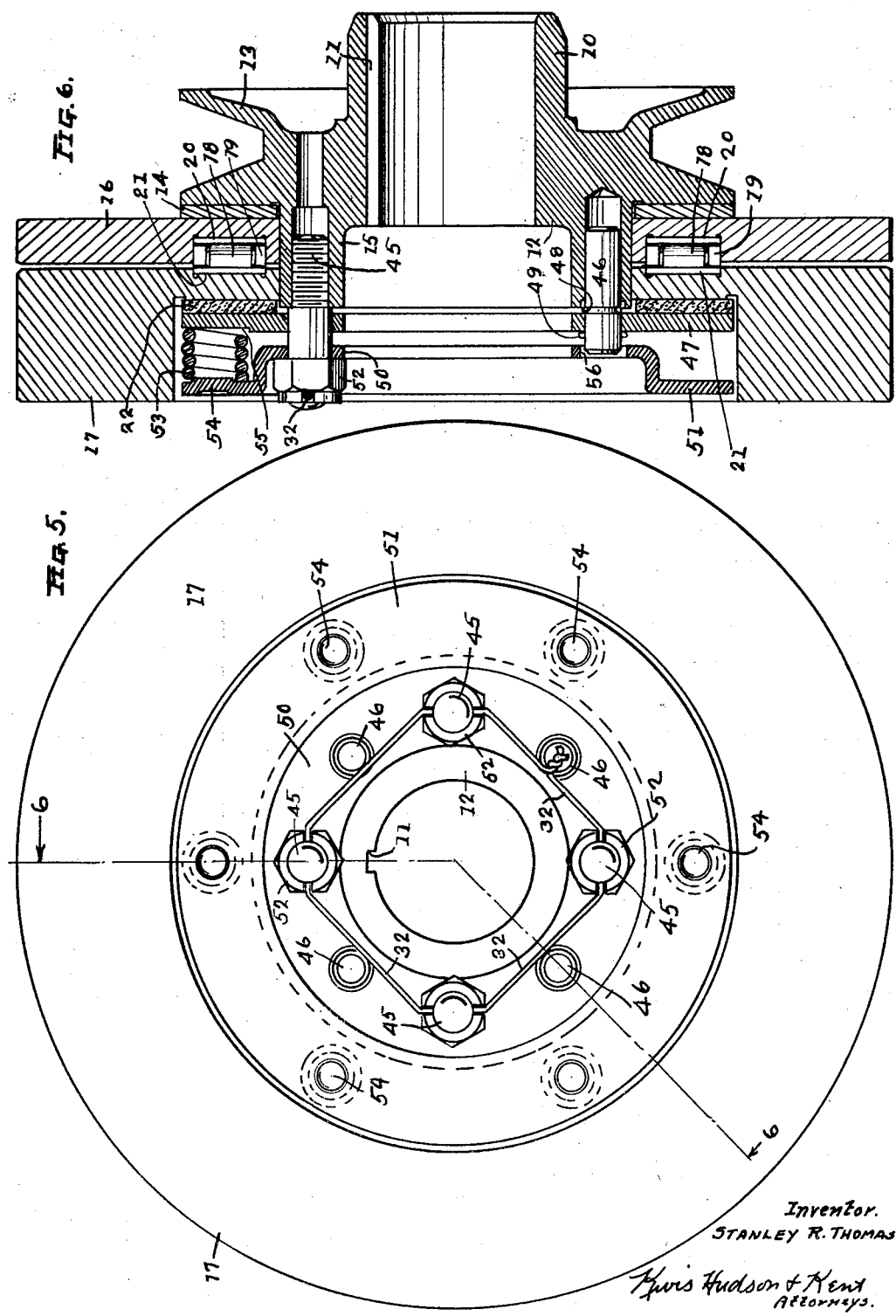

Patented Jan. 31, 1933

1,895,825

UNITED STATES PATENT OFFICE

STANLEY R. THOMAS, OF CLEVELAND, OHIO, ASSIGNOR TO PEERLESS MOTOR CAR CORPORATION, OF CLEVELAND, OHIO, A CORPORATION OF VIRGINIA

TORSIONAL VIBRATION DAMPER

Application filed April 29, 1930. Serial No. 448,406.

This invention relates to improvements in vibration dampers for internal combustion engines, more specifically means for damping torsional vibrations in an engine shaft. The desirability of a device of this character is well recognized in the art, particularly in connection with relatively long crank shafts, where the torsional vibrations are most apparent.

Vibration dampers as heretofore constructed have embodied what is in effect a single fly-wheel, loosely mounted upon that end of the crank shaft which is remote from the main fly-wheel. This auxiliary fly-wheel is frictionally driven from the crank shaft. When the engine is started and operated at a given speed, the inertia of the auxiliary fly-wheel tends to keep it rotating at a constant rate. The power impulses transmitted to the shaft from the various pistons produce local acceleration of speed in the crank shaft, the metal of the shaft being resilient enough to permit this, and it is these local accelerations and succeeding retardations that produce what we call torsional vibration. The frictional connection between the constantly rotating fly-wheel and the vibrating crank shaft damp out these vibrations more or less completely. Now, I have discovered that the single unit dampers heretofore in use are not effective to damp out these vibrations throughout the entire range of speeds of the modern automobile engine. The mass of the auxiliary fly-wheel and the effectiveness of the friction clutch by means of which this fly-wheel is connected with the crank shaft may be so selected and adjusted that the vibrations in question will be damped out through a given range of speeds, say for instance at all speeds above thirty miles per hour. In that event the construction and adjustment are such that the fly-wheel is actually locked to the crank shaft until such speed is attained. On the other hand, if the construction and adjustment are such that the fly-wheel becomes effective at lower speeds, say ten or twenty miles per hour, the friction connection with the crank shaft is necessarily so weak that at high speeds there is very little damping effect.

Accordingly it is an object of my invention to provide means for damping out torsional vibrations, which shall be effective throughout the speed range of a vehicle engine.

Another object of the invention is to provide a plural unit vibration damper, the different units of which shall begin their damping action successively as the speed of rotation of the crank shaft reaches certain predetermined values.

Still another object is the provision of a vibration damper of this character in which the fly-wheel units shall differ in mass, the coefficients of friction between the various units and the crank shaft remaining substantially equal.

Other objects and features of novelty will appear as I proceed with a description of those embodiments of the invention which, for the purposes of the present application, I have illustrated in the accompanying drawings, in which Figure 1 is a central longitudinal sectional view through a damper constructed in accordance with the present invention.

Fig. 2 is a front elevation of the same upon a somewhat smaller scale.

Fig. 3 is a fragmental cross sectional view taken substantially on the line 3—3 of Fig. 2.

Fig. 4 is a fragmental cross sectional view, similar to Fig. 1, of a modified form of the invention.

Fig. 5 is a front elevational view of a further modification, and

Fig. 6 is a central longitudinal sectional view taken substantially on the line 6—6 of Fig. 5.

In the drawings, I have shown at 10 an inner member or hub, adapted to be slid onto the forward end of an engine crank shaft, and provided with a keyway 11 by means of which it may be locked against relative rotation. In its forward end this hub member is provided with a counterbore 12 for the reception of a nut to be threaded upon the forward end of the crank shaft. By this means the hub is held against movement longitudinally of the shaft.

Integral with the hub 10 I form a V-pulley 13, by means of which driving effort may be communicated through a V-belt to the engine fan. The forward side of this pulley is formed flat and constitutes an abutment against which rests one face of a friction ring 14 made preferably of fiber. This ring is mounted upon an annular portion 15 of the hub which projects forwardly from the pulley 13. This annular portion 15 of the hub constitutes the support not only for the friction ring 14, but also for two auxiliary fly-wheels 16 and 17 which are rotatable upon the annular portion 15.

The two annular fly-wheels 16 and 17 differ considerably in weight, as will be apparent from the illustration in Figs. 1 and 3. They are independently mounted so as to be capable of rotation relatively to each other, and in order to facilitate such relative rotation I preferably employ between them an anti-friction thrust bearing. In the present instance this takes the form of anti-friction rollers 18 mounted in an annular cage 19 supported by the fly-wheel 16. Flat steel rings 20 and 21, mounted in the fly-wheels 16 and 17 respectively, form bearing surfaces against which the rollers 18 work. A second friction ring 22 is mounted on the hub in front of the inner portion of fly-wheel 17.

In the annular portion 15 of the hub I mount a series of studs 23. A flat metal ring 24 is perforated at corresponding points in order to receive the studs. At positions intermediate the studs 23 the annular portion 15 is provided with a further series of smooth holes 25, and the ring 24 has registering holes provided therein. When the parts are assembled dowels 26 are fitted through the ring 24 into the holes 25 and then welded to the ring 24, as indicated at 27. By this means the ring 24 is properly positioned and centered, and as the pins 26 do not extend to the bottom of the holes 25, the ring can move longitudinally of the crank shaft upon the studs 23. It is urged inwardly or rearwardly by coil springs 28 and 29 surrounding the studs 23 and working against the washers and nuts 30 and 31, by means of which the tension of the springs may be regulated. When the proper adjustments are completed, a wire tie 32 is threaded through holes in the studs 23 and castellated slots in the nut 31, to lock the latter in place.

In the modification illustrated in Fig. 4, the construction is substantially the same as that heretofore described except that the two fly-wheels 36 and 37 are of the same weight instead of different weights, and the difference in damping effect is accomplished by employing different friction connections between the two fly-wheels and the hub 10. To this end, the cage 38 for the rollers 39 is mounted in the fly-wheel 37, but projects into a groove in the fly-wheel 36 to the same depth, in order that the dimensions of the two fly-wheels may remain substantially identical. However, sufficient clearance is left between the cage 38 and the walls of the groove in fly-wheel 36 to prevent any contact between them. Bearing rings 40 and 41, similar to the rings 20 and 21 of the first described form, are also used.

Between the fly-wheel 36 and the pulley 13 I employ a fiber ring 42 similar to the ring 14, but no such ring is used in front of the fly-wheel 37. A metal ring 44 similar to the ring 24 of the first described form, mounted upon studs 23 and pressed inwardly by springs 28 and 29, is also employed.

The modification illustrated in Figs. 5 and 6 is of the same general character as that shown in Figs. 1, 2 and 3, and in so far as certain parts are common to the two constructions I have employed the same reference numerals in order that one description may serve for both.

In the annular portion 15 of the hub of this modification I provide threaded sockets for the reception of studs 45. At positions intermediate the studs 45, on the same radius preferably, I provide smooth holes in which I mount dowel pins 46. The studs 45 and pins 46 are for the same purpose as the corresponding parts in the first described form of the invention, but they are somewhat different in construction.

Upon the studs and pins there is supported a flat metal ring 47 which is capable of moving upon the studs a short distance axially of the device. The pins 46 are each provided with an annular groove in which is mounted a split ring 48. These split rings form abutments against which the rear face of the ring 47 bears. This ring 47 is welded to each of the pins 46 at the juncture of the front surface of the ring with the pins, as indicated at 49 in Fig. 6. Hence the pins 46 are secured against movement relative to the ring 47, and when the ring moves the pins slide with it in their sockets.

A second annular plate 50 with a forwardly offset peripheral outer portion 51 is also mounted upon the studs 50 and bears against nuts 52 in the studs. Coiled compression springs 53 are mounted at regular intervals between ring 47 and the peripheral portion 51 of annular plate 50. Suitable means are employed to prevent these springs from getting out of place. In the present instance I have shown for this purpose bosses 54, which are pressed out of the peripheral portion 51 of the plate 50, and circular pockets 55 machined into the forward surface of ring 47. Suitably positioned holes 56 in the plate 50 serve to clear the pins 46 and permit movement of the plate relative thereto. It will be seen that by removing the coil springs from the studs and locating them on a circle of greater radius than the studs, as is done in this modification, the over-all length of the device may be decreased.

Referring first to the operation of the preferred form of the invention, when the device is assembled upon the crank shaft of an engine, the nuts 31 are turned down to a predetermined extent so as to enable the springs 28 and 29 to exert a certain pressure. The fly-wheel 17 is thereby gripped between the friction ring 22 and the rollers 18 with a certain degree of friction, and the fly-wheel 16 is gripped between the rollers 18 and the friction ring 14 with the same degree of friction. When the engine is run at speeds below a certain minimum, say thirty miles per hour, this frictional connection is sufficient to effectively lock the lighter fly-wheel 16 to the hub 10 and thus to the crank shaft, so that this fly-wheel partakes of all the vibrations of the crank shaft. The fly-wheel 17, however, is of such mass that after it has come up to speed, its inertia is sufficient to overcome its frictional connection with the crank shaft. It therefore tends to rotate at a continuous even rate during any substantially constant speed of the crank shaft. The even rotation of this fly-wheel in turn exerts an effect upon the unevenly rotating shaft through the friction connection between them, tending to smooth out or damp out the vibrations, that is to say the variations from regular rotation.

When the predetermined speed of thirty miles per hour is reached the inertia of the lighter fly-wheel 16 also becomes sufficient to overcome its frictional connection with the crank shaft. From that time on, that is through the higher speed ranges, both fly-wheels tend to keep up their regular even rotation and both friction rings 14 and 22 tend to make the crank shaft accommodate itself to such regular rotation. Hence the damping effect is approximately doubled above this critical speed. The control is of course automatic, and by variations in the weight of the respective fly-wheels, by selection of different materials for the friction rings 14 and 22, and by adjustment of the springs 28 and 29, the critical speed above mentioned may be changed to suit conditions. While but two fly-wheels are here illustrated and described, it will be obvious that a greater number might be employed without departing from the spirit of the invention. The operation of the form shown in Figs. 5 and 6 need not be separately described, as it is the same in essential respects as that just given.

The operation of the modified form of the invention illustrated in Fig. 4 is approximately like that above described, although the difference in the action of the fly-wheels 37 and 36 depends upon the different frictional connections between those fly-wheels and the crank shaft rather than upon the making of the two fly-wheels of different mass. In this case the fly-wheel 37 is gripped between the rollers 39 and ring 44, the coefficient of friction between this ring and the fly-wheel being relatively low. Hence the inertia of the fly-wheel 37 at lower speeds is sufficient to overcome the frictional connection of this fly-wheel to the crank shaft, and its damping action becomes effective throughout the lower speed range. The fly-wheel 36 is gripped between the rollers 39 and the friction ring 42, and because of the fact that the coefficient of friction between this ring and the fly-wheel is relatively high, this fly-wheel is in effect locked to the shaft until the critical speed is reached, when the damping effect of this fly-wheel is added to that of the fly-wheel 37.

While in the foregoing description and in the accompanying drawing I have disclosed certain embodiments of the invention more or less in detail, I desire it to be understood that such detail disclosure has been resorted to primarily for the purpose of fully illustrating the invention, and that it is not to be construed as amounting to a limitation upon the scope thereof.

Having thus described my invention, I claim:

1. In a vibration damper for engine shafts, a hub adapted to be secured to the engine shaft, a fixed abutment at one end of said hub, a pair of fly-wheels supported upon and independently rotatable with respect to said hub, said fly-wheels being of unequal mass, a friction ring interposed between said abutment and the adjacent fly-wheel, a ring rotatable with and slidable axially upon the opposite end of said hub, and resilient means for causing said last named ring to exert pressure against the adjacent fly-wheel, whereby said pressure is transmitted to the second fly-wheel and through said friction ring to said abutment.

2. In a vibration damper for engine shafts, a hub adapted to be secured to the engine shaft, a fixed abutment at one end of said hub, a pair of fly-wheels supported upon and independently rotatable with respect to said hub, said fly-wheels being of unequal mass, friction rings supported upon said hub on the remote sides of said fly-wheels, a metal ring rotatable with and slidable axially upon said hub at the end thereof which is remote from said abutment, and resilient means for exerting pressure upon said metal ring in the direction of said abutment, whereby said friction rings are pressed against said fly-wheels tending to lock the same to said hub.

3. In a friction damper for engine shafts, a hub adapted to be secured to the engine shaft, a fixed abutment at one end of said hub, a pair of fly-wheels supported upon and independently rotatable with respect to said hub, said fly-wheels being of unequal mass, anti-friction means interposed between said fly-wheels, friction rings supported upon said hub on the remote sides of said fly-wheels, a metal ring rotatable with and slidable axially upon said hub at the end thereof which is remote from said abutment, and resilient means for exerting pressure upon said metal ring in the direction of said abutment, whereby said friction rings are pressed against said fly-wheels to lock the same to said hub.

In testimony whereof, I hereunto affix my signature.

STANLEY R. THOMAS.